US005148698A

United States Patent [19]

Dischler

[11] Patent Number: 5,148,698

[45] Date of Patent: Sep. 22, 1992

[54] COMPRESSION TOOL

[76] Inventor: Helmut Dischler, Droste-Hülshoff-Str. 9, D-4040 Neuss 1, Fed. Rep. of Germany

[21] Appl. No.: 679,943

[22] Filed: Apr. 3, 1991

[30] Foreign Application Priority Data

Apr. 12, 1990 [DE] Fed. Rep. of Germany ....... 4011822

[51] Int. Cl.[5] ...................... B21D 41/04; B23P 11/00

[52] U.S. Cl. ........................................ 72/410; 72/416; 29/237

[58] Field of Search ............ 72/410, 409, 452, 453.16, 72/453.15, 402, 416; 29/237

[56] References Cited

U.S. PATENT DOCUMENTS

| | | | |
|---|---|---|---|
| 2,326,709 | 8/1943 | Watson | 72/410 |
| 2,381,748 | 8/1945 | Howe | 29/148 |
| 2,973,024 | 2/1961 | Merriman | 72/402 |
| 3,203,221 | 8/1965 | Conner | 72/410 |
| 3,276,238 | 10/1966 | Erdmann | 72/410 |
| 3,568,495 | 3/1971 | Duffield | 72/402 |
| 3,575,036 | 4/1971 | Hoffman | 72/410 |
| 3,688,553 | 9/1972 | Demler | 72/410 |
| 3,695,087 | 10/1972 | Tuberman | 72/402 |
| 3,756,064 | 9/1973 | Erdmann | 72/410 |
| 4,276,765 | 7/1981 | Yoneda | 72/402 |

FOREIGN PATENT DOCUMENTS

| | | |
|---|---|---|
| 1187870 | 10/1965 | Fed. Rep. of Germany . |
| 2458172 | 5/1976 | Fed. Rep. of Germany . |
| 2511942 | 9/1976 | Fed. Rep. of Germany . |
| 2136782 | 12/1982 | Fed. Rep. of Germany . |
| 3423283 | 1/1986 | Fed. Rep. of Germany . |
| 3513129 | 10/1986 | Fed. Rep. of Germany . |
| 1426844 | 12/1965 | France . |
| 2086319 | 12/1971 | France . |
| 60-141456 | 7/1985 | Japan . |

*Primary Examiner*—Daniel C. Crane
*Attorney, Agent, or Firm*—Joseph W. Berenato, III

[57] ABSTRACT

A compression tool includes a housing having adjacently disposed first and second oppositely disposed portions defining therebetween a clearance. First and second pivot levers are provided, and each of the levers is pivotally secured to one of the portions and extends therefrom beyond the housing. At least three compression jaws are operably associated with the housing and disposed about the clearance. One of the jaws is secured to the housing and the other two of the jaws are each connected to one of the levers and are pivotal therewith. The one jaw is separate from the first and second levers. Each of the jaws has an arcuate compression surface. A movement assembly is operably associated with each of the levers and the associated jaw for causing cooperating movement thereof. A drive assembly is operably associated with each of the levers and is disposed exteriorly of the housing for causing pivoting thereof between a first open position and a second closed position. Pivoting of the levers from the first open to the second closed position causes the other two jaws to pivot on each respective lever and relative to the one jaw so that the compression surfaces define a circle for compressing a work piece therebetween.

20 Claims, 4 Drawing Sheets

COMPRESSION TOOL

The invention concerns a compression tool, in particular for joining tubular workpieces, with more than two arcuate compression jaws so movable relative to each other that they can open in order to be placed on the workpiece and that they complement one another into a closed compression space toward the end of compression, and also comprising at least one drive system to move the compression jaws towards compression.

Metal coupling sleeves, preferably steel, and plastically deforming, are employed to join pipe ends. The sleeve inside diameter exceeds the outside diameter of the pipe ends to be joined by an amount such that when being radially compressed, they remain deformed until coming to rest against the outside of the pipe ends. As disclosed by the German patent 1,187,870, such coupling sleeves additionally may comprise an annular groove near each end which receives an elastic sealing ring.

The radial compression is implemented by compression tools illustratively known from the German patent 2136782. This compression tool comprises two clamping jaws each with two arms, at least one clamping jaw being pivotably supported on the compression tool. The compression jaws comprise compression surfaces forming arcs of circle of equal radii, enclosing a compression space. Instead of being arcs of circle, the compression surfaces also may be contoured, for instance to form a polygonal or oval compression space.

The arms of the compression jaws away from the compression space can be spread apart against the force of a spring whereby the compression jaws are moved relative to each other in the region of the compression space. The spreading apart takes place by means of adjacent and abutting pressure rollers which are jointly moved by a drive system in the form of an operational cylinder between the arms and in this manner pivoting the compression jaws.

The German Offenlegungsschrift 3423283 describes a development of this compression tool. In this compression tool there are two compression jaws each pivotably supported on a drive lever in turn pivotably guided on the compression tool. The drive levers comprise opposite arms which can be spread apart by pressure rollers moved by an operational cylinder into the gap. Moreover the compression jaws are so guided in slide means that upon pivoting of the drive levers into the open position they will be pivoted up about their linkages at the drive levers whereby a wide, tong-like aperture is created between the compression jaws, facilitating the seating of the pipe ends to be joined, or of a coupling sleeve.

When pivoting the drive levers in the reverse direction, the clamping jaws again are so pivoted that the mid-perpendiculars to their arcs of circle approximately coincide and upon further pivoting motion of the drive levers the clamping jaws are displaced relative to one another in parallel manner. The clamping jaws are further displaced during compression until at the end of this compression they enclose a circular surface, whereby they have deformed the pipe ends or the coupling sleeve with corresponding reduction in diameter.

This compression tool has been found practically useful provided there be comparatively modest reduction in diameter or squeeze depth. Where the squeeze depths are more substantial—which shall be the case when the pipe connection must withstand higher internal pressures, more than two compression jaws must be provided to prevent beads from being formed between the end faces of the compression jaws, whereby their complete closure would not take place. Such compression tools are known for instance from the German Offenlegungsschriften 2118782; 3513129; the German Auslegeschriften 2511942 and 1907956. All the compression tools described therein share in common that all the clamping jaws are displaceable and are guided in the radial direction. This entails complex guide means and drive systems, whereby the compression tools become heavy and hard to handle, and also expensive.

The object of the invention accordingly is to so design a compression tool of the initially cited kind that in spite of the presence of more than two compression jaws, it can be as simple as possible and therefore easily handled and also economical to manufacture.

This problem is solved by the invention in that one of the compression jaws is a rest which can be placed on the workpiece and the other compression jaws are displaceably by means of the drive system(s) and are so guided that during compression they always move toward the center of the compression space in the closed state of the compression tool. Appropriately the compression jaws are so displaced relative to each other that their particular adjacent and opposite end faces are equal distances apart at the beginning of compression.

The compression tool of the invention is characterized by its simple design because one of the compression jaws is a rest and accordingly requires neither guide nor drive. The remaining compression jaws are so guided and driven that during compression they move in very specific directions, namely toward the center of the compression chamber in the closed state of the compression tool. This is a capital condition for equal forces indeed acting from all sides on the workpiece.

In one embodiment of the invention, the compression jaws evince equal arcs of circle at their periphery, whereby the gaps between the particular opposite end faces of the compression jaws are evenly distributed over the periphery.

Where three compression jaws are present, the directions of motion of the two displaceable compression jaws should subtend between them an angle of 60° which is symmetrical to the mid-perpendicular on the rest and which opens away from this rest. Where four compression jaws are involved, the directions of motion of the two compression jaws adjacent to the rest shall subtend an angle of 90° during compression , this 90° angle being symmetrical to the mid-perpendicular on the rest and opening away from it.

In a further feature of the invention, the rest is designed as a rest-yoke present at the free end of the compression tool and pivotably supported on one side while being detachable or lockable at the opposite side. This rest-yoke can be pivoted away when the compression tool is placed on the pipe ends to be joined, i.e. on the coupling sleeve. After pivoting back and locking, the displaceable compression jaws can be moved by the drive system toward the rest.

In a further embodiment of the invention, the displaceable compression jaws on one hand rest against the guide means determining their displacement directions and on the other hand rest against a compression force displaceable toward the rest and connected to the drive system(s) and supporting in displaceable manner the compression jaws adjacent to the rest. It is possible in this respect to install a further compression jaw at, or connect it with the compression force between the compression jaws that are displaceable relative to this force, where this further jaw is opposite the rest. The compression force is part of the drive system and illustratively may be a hydraulic actuator or be connected to such. Instead of such a compression force, each displaceable compression jaw also may be fitted with its own drive system, for instance again a hydraulic actuator. Such an actuator may be a pressure or a traction force.

In modification or deviation from the above, however, at least part of the displaceable compression jaws may be seated on pivot levers pivoted by the drive system(s). Such assemblies of pivot levers already are known from the German Offenlegungsschrift 3423283. They may be stationary on the compression tool at least as regards the actuation of the compression jaws near the rest. There is the possibility, similarly to the compression tool of the German Offenlegungsschrift 3423283, to mount the compression jaws in compression-jaws supports pivotably resting on the pivot levers. To control the displacement of the compression-jaws holders, a slide means may be used, again as already disclosed in the German Auslegeschrift 3423283.

The invention furthermore provides that the rest be part of compression-ring with hinging compression jaws, which is open between two compression jaws, the compression ring being closed when called for by the drive system(s). For that purpose the drive system(s) may act on the free ends of the compression ring. This embodiment mode makes it possible to design the compression-ring drive system(s) separately and for the drive system(s) and the compression ring to include coupling components whereby they can be operationally coupled. In this case therefore the compression tool is in two parts, first the compression ring being laid around the workpiece and the compression jaw acting as a rest being made to abut, and then the compression tool being placed against the compression ring. This embodiment allows very easy handling because the individual components are substantially more lightweight and can be handled independently from each other.

The compression ring may comprise at least one traction belt resting externally against at least the displaceable compression jaws to make the compression jaws move relative to each other, and two traction belts also may be provided for such purpose too. This design is especially lightweight and economical.

To assure that the end-face gaps between the compression jaws are precisely identical at the beginning of compression, a further feature of the invention provides that at least part of the compression jaws in compression-jaws supports be displaceable relative to these, with corresponding guide systems being present which ensure such equal gaps between the compression jaws at the beginning of compression. Essentially the compression jaws can be guided displaceably along the periphery. Slide guides are applicable as guide systems, however spring-loading toward stops also may be used.

The drawing more closely shows embodiments of the invention.

Figure 1:
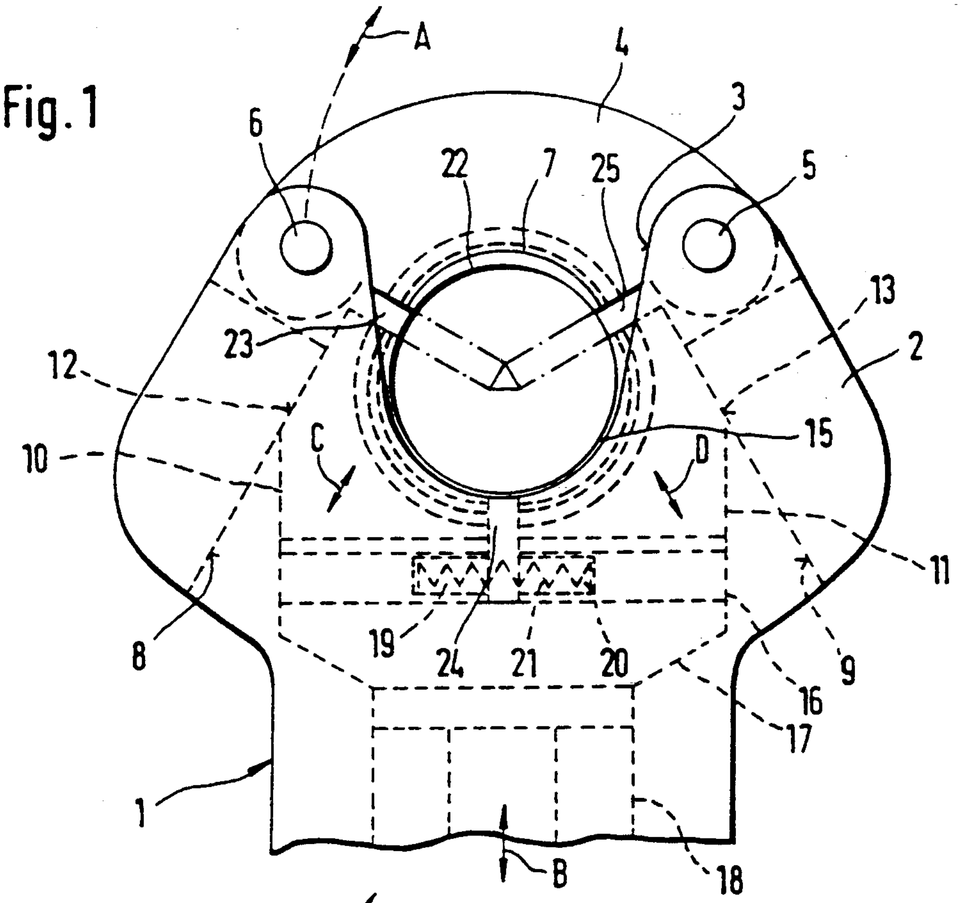
FIG. 1 is a compression tool in the open position.
Figure 2:
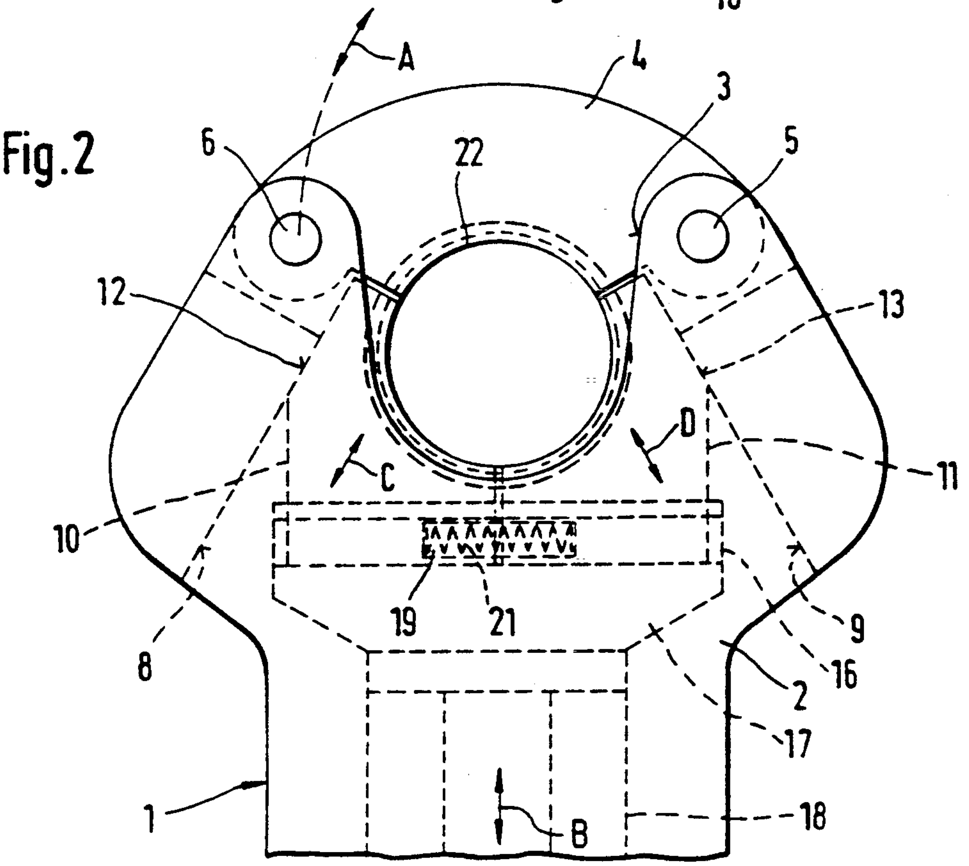
FIG. 2 is the compression tool of FIG. 1 in the closed position.

FIGS. 1 and 2 show only the upper head part of a compression tool 1. It comprises a tool housing 2 hollow on the inside and first flares upward and then tapers conically. A U-shaped clearance 3 is present at the middle.

The free ends of the clearance 3 are connected by a rest-yoke 4. The rest yoke 4 is pivotably supported by a support bolt shown on the right in this view. On the left side, the rest-yoke 4. is fixed in the shown position by a locking bolt 6. This locking bolt 6 passes through matching clearances in the tool housing 2 and in the rest 4 and is easily removed. After it has been removed, the rest-yoke 4 can be pivoted about the support bolt 5 in the direction of the double arrow A, namely clockwise until the clearance 3 is totally open in the upward direction.

On its inside the rest-yoke 4 comprises an arcuate compression surface 7 subtending an angle of 120° symmetrical to the longitudinal axis of the compression tool 1. The compression surface 7 comprises a peripheral groove open inward. It can be exchangeable mounted to rest-yoke 4.

Oblique guide surfaces 8,9 extend inside the tool housing 2 and subtend an angle of 60° and are mirror-symmetrical with respect to the longitudinal axis of the compression tool 1. One compression jaw 10, 11 rests against the guide surfaces 8,9 across correspondingly oblique support surfaces 12, 13. The compression jaws 10, 11 also are mirror-symmetrical with respect to the longitudinal axis of the compression tool 1 and each have a compression surface 14, 15 in the form of arcs of circle of 120°. They too comprise a peripheral groove on the inside. The arcs of circle of all the compression surfaces 7, 14, 15 evince the same radii. The compression jaws 10, 11 enter at the bottom a guide groove 16 which is horizontal and transverse to the longitudinal axis of the compression tool 1, said groove being shaped into the head 17 of a compression force 18. The lower sides of the compression jaws 10, 11 also are horizontal, whereby the compression jaws 10, 11 are displaceably guided in the groove 16 transversely to the longitudinal axis of the compression tool 1, namely in geometrically locking manner as in a dovetail guide.

Transverse and coaxial blind holes 19, 20 are present in the lower segments of the compression jaws 10, 11. A compression spring 21 is set into these blind holes 19, 21 and biases the compression jaws 10, 11 outward and thereby, on account of the support surfaces 12, 13, against the guide surfaces 8, 9. The compression force 18 is supported in vertically and linearly displaceable manner in the direction of the longitudinal axis of the compression tool 1 (double arrow B). It is actuated by a pneumatically or hydraulically loaded actuator not shown herein in further detail.

When the compression tool 1 is being used, first the lock of the rest-yoke 4 is loosened by means of the locking bolt 6, i.e., this locking bolt 6 is pulled out and the rest-yoke 4 is pivoted clockwise until the forkshaped aperture 3 is entirely cleared. Simultaneously the compression force 18 is located in a downwardly retracted position. The compression tool 1 thereupon can be set in such manner on a coupling sleeve 22 that the latter shall extend perpendicularly to the plane of the drawing through the clearance 3 which receives it. Thereupon the rest 4 is pivoted back about the coupling sleeve 22 and locked by inserting the locking bolt 6. Now the coupling sleeve 22 has been enclosed by the compression tool 1.

Thereupon the compression jaws 10, 11 are made to rest against the coupling sleeve 23 by raising the compression force 18. Because its radius is less by the anticipated squeeze depth than that of the radius of the coupling sleeve 22 prior to the compression, the compression surfaces 7, 14, 15 rest only by their outer transverse edges against the periphery of the coupling sleeve 22. Free gaps 23, 24, 25 of equal size remain between the end faces of the compression jaws 10, 11 and of the rest-yoke 4. The radii of the arcs of circle of the compression surfaces 7, 14, 15 originate at centers located on the pieces of an isosceles triangle.

The compression force 18 is raised upon further application of pressure. In the process, the compression jaws 10, 11 slide by means of their support surfaces 12, 13 over the guide surfaces 8, 9, whereby a motion in the directions of the arrows C, D is imparted to them. The two directions of motion subtend the same angle as the guide surfaces 8, 9, namely 60°. In this process the compression jaws 10, 11 slide simultaneously and horizontally inside the groove 16 of the compression force 18 toward one another and against the opposition of the compression spring 21. The coupling sleeve 22 is swaged radially in this manner, that is, its diameter is reduced by the desired squeeze depth. At the end of compression, the compression surfaces 7, 14, 15 enclose a circular compression space and the gaps 23, 24, 25 have become null.

To remove the compression tool 1 from the coupling sleeve 22, the compression force 18 is moved back again. Following removal of the locking bolt 6, the rest-yoke 4 is pivoted away whereby the compression tool 1 can be removed.

Figure 3:
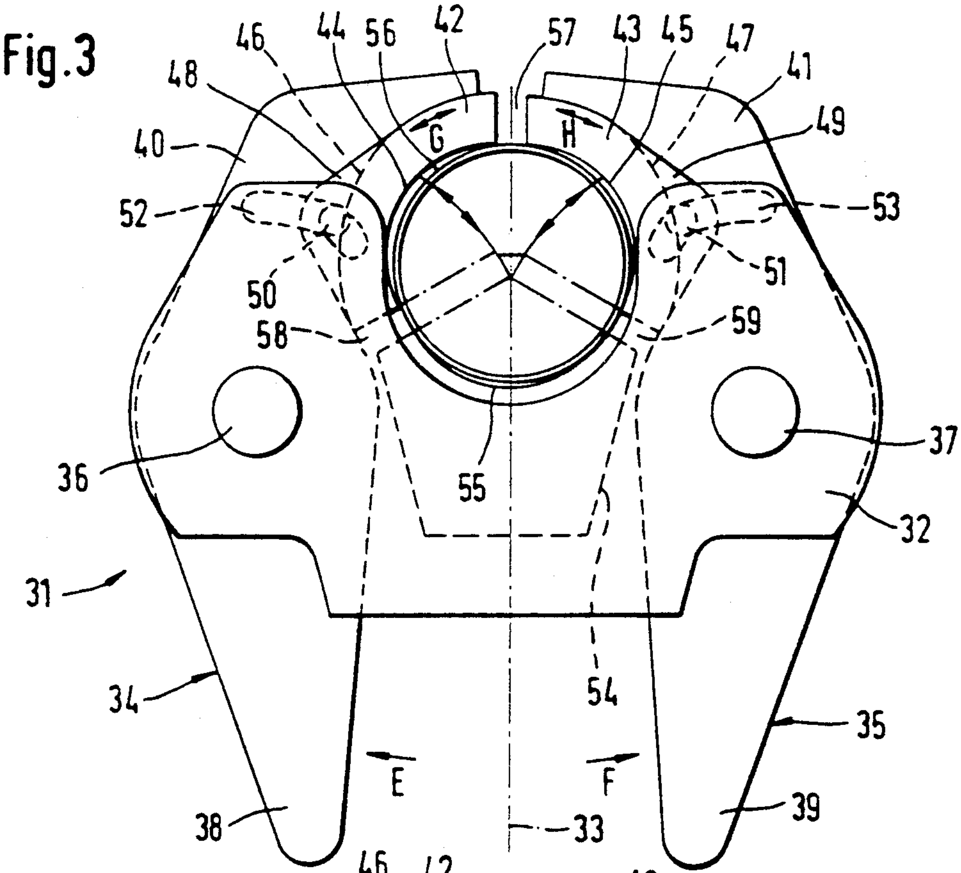
FIG. 3 is another compression tool in the open position.
Figure 4:
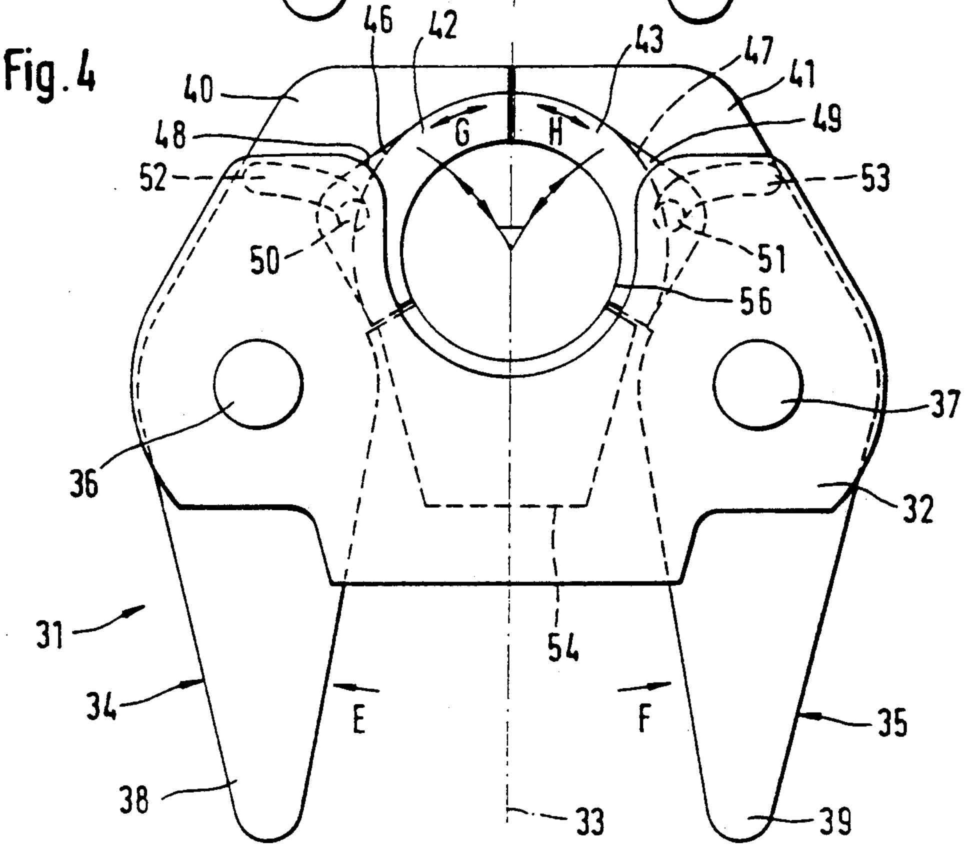
FIG. 4 is the compression tool of FIG. 3 in the closed position.

Again FIGS. 3 and 4 shown a compression tool 31 only in part, namely its head region. The compression tool 31 comprises a tool housing 32 hollow on the inside and extended downward to receive a drive and to allow handling, though this is not shown herein in further detail.

Two drive levers 34, 35 in the tool housing 32 extend in mirror-symmetry to the longitudinal axis 33 and are supported pivotably on pivot bolts 36, 37 perpendicular to the plane of the drawing. The downward arms 38, 39 of the drive levers 34, 35 are spread apart in the directions of the arrows E, F in order to pivot and against the opposition of a spring, not shown here in further detail, which pulls together the arms 38, 39. A pair of pressure rollers is used to spread apart the arms 38, 39, said pair being moved by a pneumatically or hydraulically driven linear actuator into the gap between the arms 38, 39. Such a drive is known per se from the German patent 2136782 and from the German Offenlegungsschrift 3423382.

Compression jaws 42, 43 are seated in the arms 40, 41 of the drive levers 34, 35 that extend upward from the pivot bolts 36, 37. Each compression jaw 42, 43 comprises inside compression surfaces 44, 45 forming arcs of circle of 120°. Both compression jaws 42, 43 are displaceably supported on the arms 40, 41 of the drive levers 34, 35 so they may move in the circumferential directions shown by the arrows G, H. For such purpose they rest by their outsides against corresponding arcuate guide surfaces 46, 47 in the arms 40, 41 coaxial with the arcs-of-circle segments of the particular compression surfaces 44, 45.

The compression jaws 42, 43 comprise laterally and externally projecting beaks 48, 49 on both sides of the guide surfaces 46, 47. The beaks 48, 49 comprise guide projections 50, 51 entering, in geometrically constrained manner, slides 52, 53 inside the tool housing 32. It is in this manner that the compression jaws 42, 43 are guided in constrained manner in the circumferential direction G, H when the drive levers 34, 35 are pivoting.

A further compression jaw is formed by a rest 54 stationary inside the tool housing 32 and comprising a compression surface 55 at the top in the form of an arc of circle of 120°. The radius of the arc of circle is the same as that of the remaining compression surfaces 44, 45.

In order to use the compression tool 31, first the arms 38, 39 of the drive levers 34, 35 are manually pushed together, that is opposite the directions E, F. The arms 40, 41 thereby open like tongs and make accessible a space between the end faces of the compression jaws 42, 43 so that the compression tool 31 can be slipped over a coupling sleeve 56 transversely to the sleeve's longitudinal axis. The compression jaws 42, 43 can be closed after the coupling sleeve 56 has been placed against the compression surface 55 of the rest 54. This takes place by spreading apart the lower arms 38, 39 of the drive lever 34, 35 by means of the drive system not shown in further detail herein. Thereupon the compression jaws 42, 43 come to rest against the outside surface of the coupling sleeve 56. Because, before compression, the radii of the compression surfaces 44, 45, 46 are less by the anticipated squeeze depth than the radius of the coupling sleeve 56, the compression surfaces 44, 45, 46 rest on the periphery of the coupling sleeve 56 only by their external transverse edges. In order that equal gaps 57, 58, 59 be generated between the end faces of the compression jaws 42, 43 and of the rest 54, the slides 52, 53 are shaped in such a way that the compression jaws 42, 43 are correspondingly circumferentially displaced relative to the arms 40, 41 of the drive levers 34, 35, that is, the left compression jaw 42 moves clockwise and the right compression jaw 43 counter-clockwise. The radii of the arcs of circle of the compression surfaces 44, 45, 55 start from origins located on the apices of an isosceles triangle.

The lower arms 38, 39 of the drive levers 34, 35 are spread apart additionally by further pressure-loading the drive system. As a result, the compression jaws 42, 43 are moved further inward, the two directions of motion substantially subtending an angle of 60° which is symmetrical to the longitudinal axis 33 and which opens away from the rest 54. This is due to the pivot bolts 36, 37 each being on straight lines starting from the origin of the arc of circle of the rest 54 and subtending an angle twice as large as that subtended by the directions of motion of the compression jaws 42, 43, i.e. 120°. Because the upper gap 57 between the end faces of the compression jaws 42, 43 would be reduced faster during compression than the gap between the compression jaws 42, 43 and the rest 54, the slides 52, 53 curve inward and downward in such manner that the compression jaws 42, 43 are circumferentially displaced relative to the arms 40, 41, namely the left compression jaw 42 counterclockwise and the right compression jaw 43 clockwise. The guidance of the slides 52, 53 is such that the gaps 57, 58, 59 remain constant during the entire compression until the end faces of the compression jaws 42, 43 and of the rest 54 make contact at the end of compression. The coupling sleeve 56 is radially swaged in this process and its diameter is reduced by the desired squeeze depth.

In order to remove the compression tool 31 from the coupling sleeve 56, the lower arms 38, 39 of the drive lever 34, 35 are again pushed together so that the upper arms 40, 41 will open like tongs. The compression tool 31 thereupon can be removed from the coupling sleeve 56.

Figure 5:
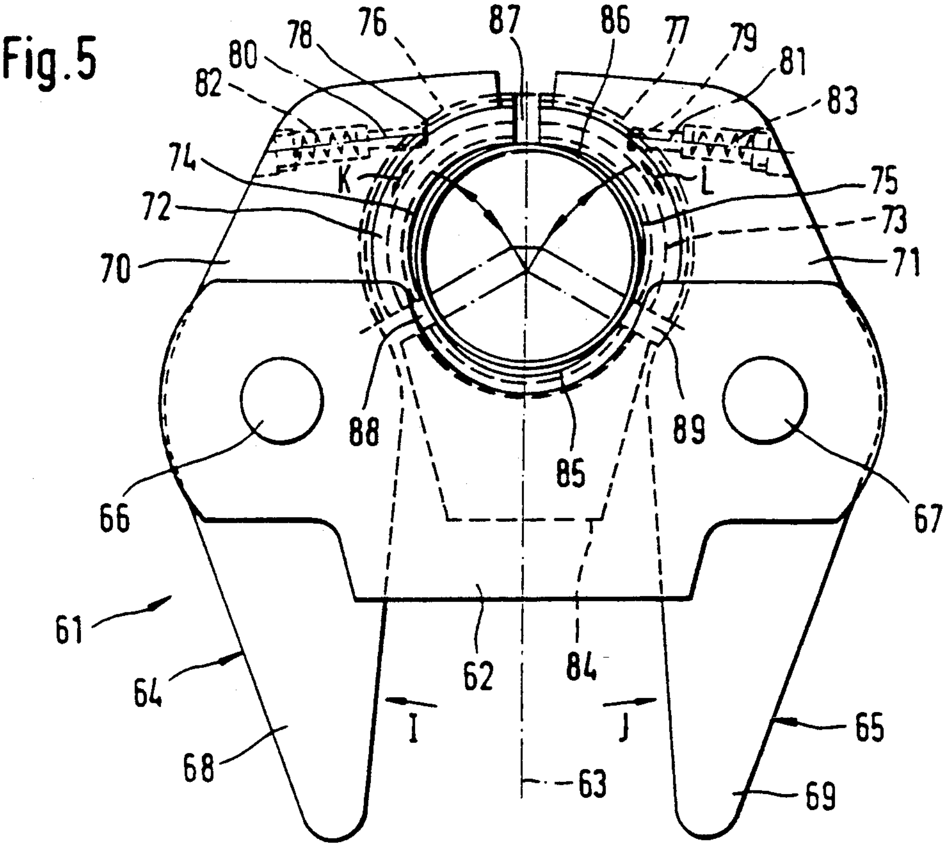
FIG. 5 is a further compression tool in the open position.
Figure 6:
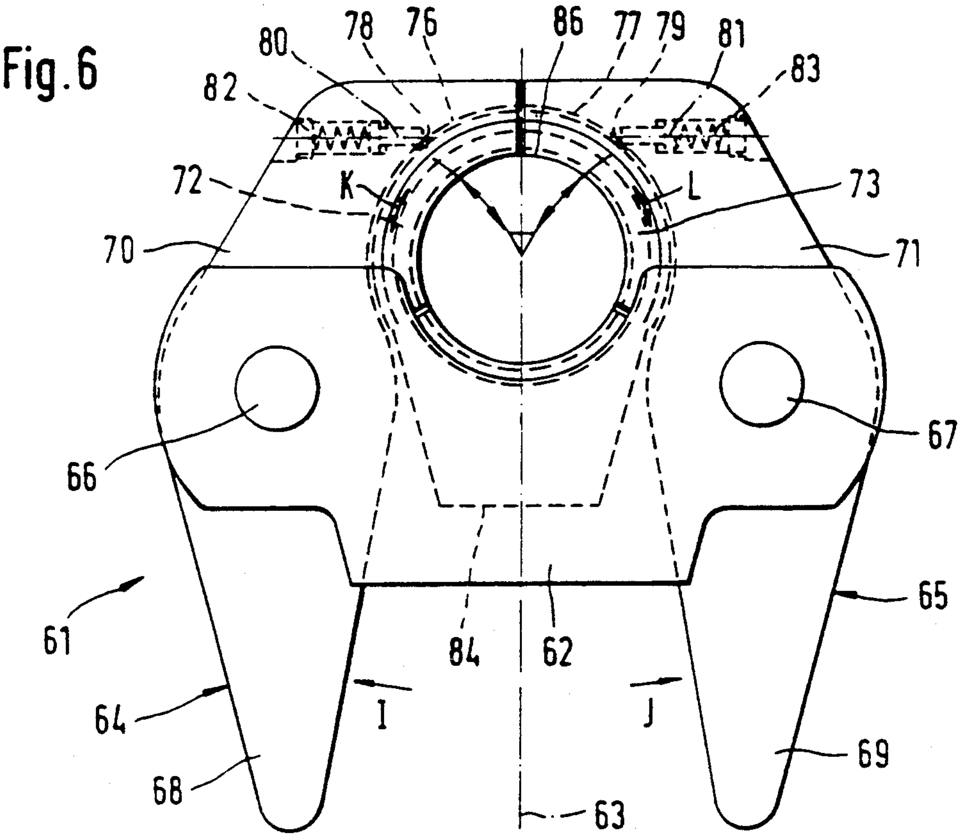
FIG. 6 is the compression tool of FIG. 5 in the closed position.

FIGS. 5 and 6 show a compression tool 61, again only in part, which is quite similar to the compression tool 31 of FIGS. 3 and 4. It comprises an internally hollow tool housing 62 extending downward to receive a drive system and to allow handling, not shown herein in further detail.

Two drive levers 64, 65 are rotatably supported in the tool housing 62 and in mirror-image manner relative to the longitudinal axis 63 on pivot bolts 66, 67 perpendicular to the plane of the drawing. The downward arms 68, 69 of the drive levers 64, 65 are spread apart in the directions of the arrows I, J for purposes of pivoting and this against the opposition of a spring, not shown in further detail, pulling together the lower arms 68, 69. A pair of pressure rollers is used to spread part the arms 68, 69 in the manner already described in relation to the compression tool 31 of FIGS. 3 and 4.

Compression jaws 72, 73 are seated in the arms 70, 71 of the drive levers 64, 65, where said arms extend upward from the pivot bolts 66, 67. These compression jaws each comprise inside compression surfaces 74, 75 forming each arcs of circle of 120°. Both compression jaws 72, 73 are supported on the upper arms 70, 71 of the drive levers 64, 65 so as to be circumferentially displaceable in the directions of the arrows K, L. For that purpose they rest by their outsides against corresponding, arcuate guide surfaces 76, 77 in the arms 70, 71 which are coaxial with the arcs of circle of the particular compression surfaces 74, 75.

The compression jaws 72, 73 comprise notches 78, 79 at their external peripheries which are engaged by pins 80, 81 axially displaceably seated in the upper arms 70, 71. These pins 80, 81 are biased by compression springs 82, 83 toward the notches 78, 79. The pins 80, 81 and the notches 78, 79 are arranged in such a way that the pins 80, 81 shall tend to move the compression jaws 72, 73 circumferentially toward each other, namely the left compression jaw 74 clockwise and the right compression jaw 73 counter-clockwise. Stops not shown in further detail herein assure that the compression jaws 72, 73 cannot be displaced beyond a maximum distance in these two directions. Obviously the guidance of the compression jaws 72, 73 is designed in such manner that they cannot drop out of their seats in the arms 70, 71, and inward, i.e., a corresponding constrained guidance is provided.

A further compression jaw is formed by a rest 84 mounted in stationary manner inside the tool housing 62 and comprising at its top side a squeezing surface 85 in the form of 120° arcs of circle. The arc of circle has the same radius as that of the other compression surfaces 74, 75.

When the compression tool 61 is put to use, first the lower arms 68, 69 of the drive levers 64, 65 are manually forced together, that is opposite the directions of the arrows I, J. As a result the upper arms 70, 71 open like tongs and provide a space between the end faces of the compression jaws 72, 73 whereby the compression tool 61 can be slipped over a coupling sleeve 86 transversely to the latter's longitudinal axis. When the coupling sleeve 86 makes contact with the compression surface 85 of the rest 84, the compression jaws 72, 73 can be closed due to spreading apart the lower arms 68, 69 using a drive system not shown herein in further detail. The compression jaws 72, 73 then come to rest against the outer surface of the coupling sleeve 86. Because the radii of the compression surfaces 74, 75, 85 are less by the anticipated squeeze depth than the radius of the coupling sleeve 86 prior to compression, the compression surfaces 74, 75, 85 rest against the periphery of the coupling sleeve 86 only by their outer transverse edges.

In order that equal-size gaps 87, 88, 89 arise between the end faces of the compression jaws 72, 73 and of the rest 84, the stops limiting the circumferential motion of the compression jaws 72, 73 are mounted accordingly. The radii of the arcs of circle of the compression surfaces 74, 75, 85 start from centers located on the apices of an isosceles triangle.

By further loading the drive system, the lower arms 68, 69 of the drive levers 64, 65 are spread apart even more. As a result, the compression jaws 72, 73 are moved further inward, the two directions of motion essentially subtending an angle of 60° symmetrical in relation to the longitudinal axis 63 and opening away from the rest 84. Again the reason is that the pivot bolts 66, 67 each are located on straight lines starting from the center of the arc of circle of the rest 84 and subtending an angle of 120°.

During compression, the compression jaws 72, 73 automatically shift circumferentially relatively to the upper arms 70, 71, namely the left compression jaw 72 counter-clockwise and the right compression jaw 73 clockwise. It was found that the gap 87, 88, 89 in this embodiment as well remains essentially equal, in spite of the inaccurate guidance during the entire compression procedure, until the end faces of the compression jaws 72, 73 and of the rest 84 come to touch at the end of compression, as shown in FIG. 6. In the process, the coupling sleeve 86 is radially swaged and its diameter is reduced by the desired squeeze depth.

Figure 7:
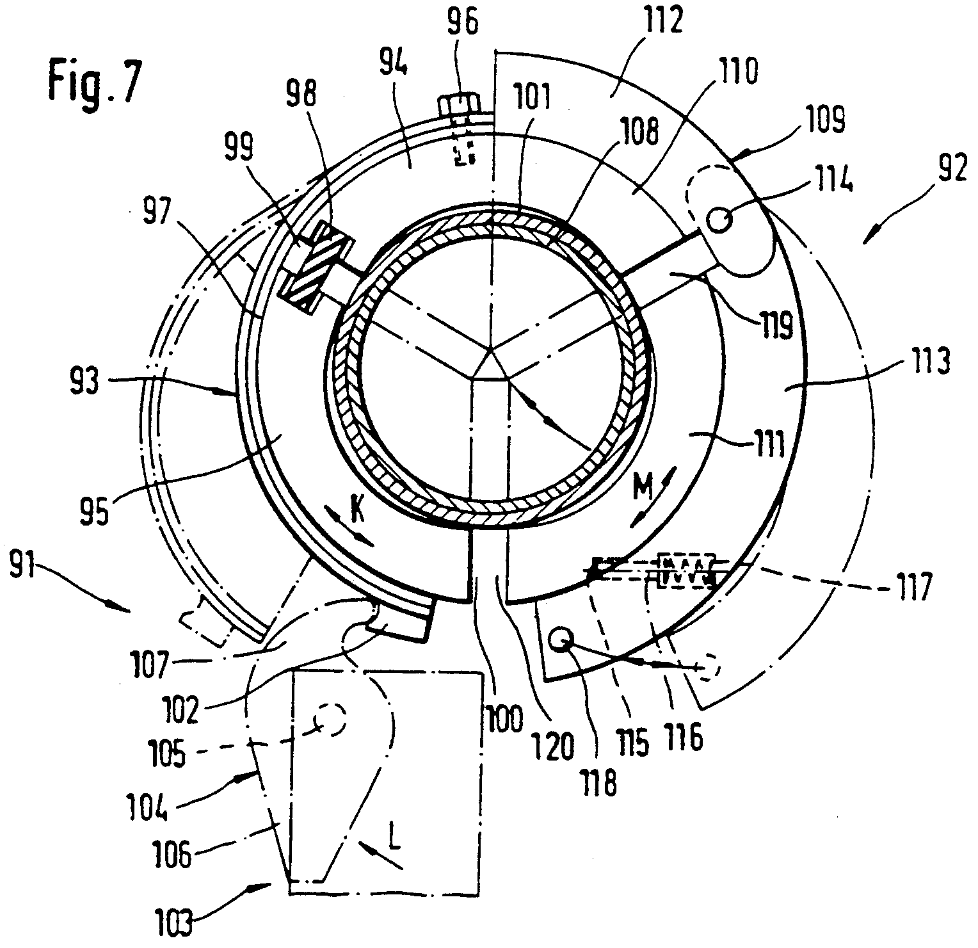
FIG. 7 is a half-representation of two further compression tools in the open position.
Figure 8:
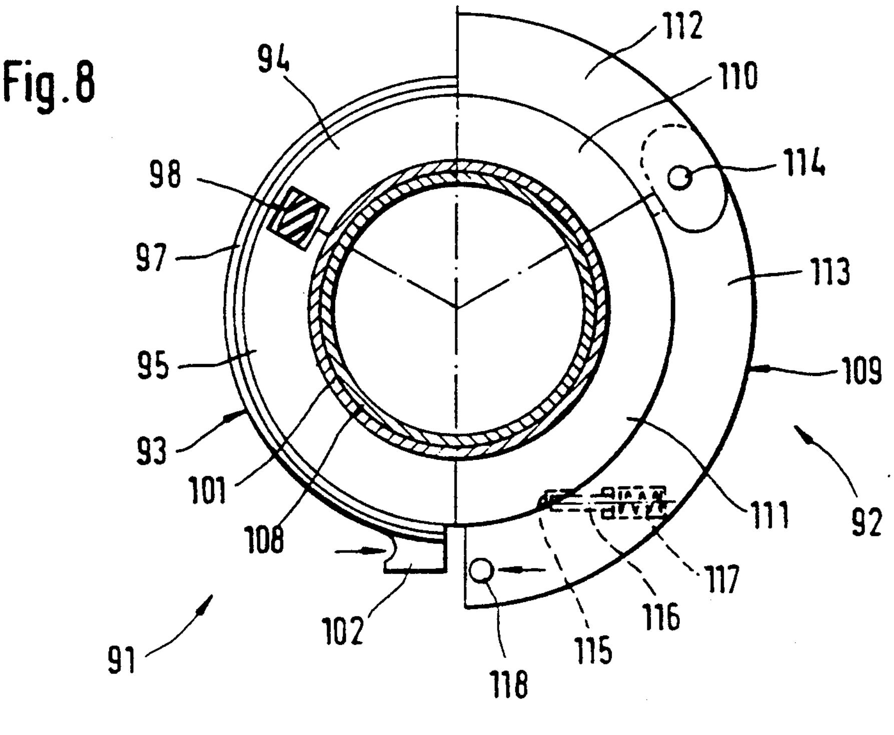
FIG. 8 shows the compression tools of FIG. 7 in the closed position.

FIGS. 7 and 8 show two compression tools 91, 92 each by its half. The left half of FIGS. 7 and 8 as regards the axis of symmetry shows the compression tool 91 and the right half the compression tool 92. Both compression tools 91, 92 are mirror-symmetrical and their design already is known from their half-representations.

The compression tool 91 shown on the left in FIGS. 7 and 8 comprises a compression ring 93 consisting of a total of three compression jaws 94, 95; on account of the half-representation the compression jaw 94 appears only in part—and one compression jaw, namely the one on the right hand side, not at all. A flexible traction belt 97 made of spring steel is affixed by means of a screw 96 to the upper compression jaw 94 and extends over the periphery of the upper compression jaw 94 and the left compression jaw 95. A corresponding traction belt is present on the other side (omitted) of the compression ring 93.

The lower compression jaws 95 are guided on the traction belts 97 so as to be circumferentially displaceable in the direction K. One rubber spring 98 each enters clearances in the opposite end faces of the compression jaws 94, 95 and is vulcanized onto them. In the unloaded state, the compression jaws 94, 95 are forced apart to a given extent by the rubber springs 98 and as a result equally wide gaps 99, 100 are created between the opposite end faces of the compression jaws 94, 95 when these rest externally against a coupling sleeve 101.

External connection fittings 102 are mounted on the free ends of the traction belts 97. A drive system 103 separate from the compression ring 93 and indicated here merely schematically and in dash-dot lines can be linked to these connection fittings 102. Accordingly the compression tool 91 consists of two independent parts that can be hooked up together.

The drive system 103 comprises two drive levers 104 of which only the left one is shown. They are rotatably supported on pivot bolts 105 which are perpendicular to the plane of the drawing. The downward arms 106 are spread in the direction of the arrow L for purposes of pivoting, and this against the opposition of a tension spring, not shown in further detail, which pulls on the lower arms 106. In order to spread apart the arms 106, a pair of pressure rollers is used as described already in relation to the compression tool 31 and FIGS. 3 and 4. The arms 107 rising from the pivot bolts 105 are shaped in such a way that they can engage the connection fittings 102 from behind.

When using the compression tool 91, first the compression ring 93 will be opened, whereby the lower compression jaws 95 are externally out of the way in the manner indicated by dash-dot lines. Thereupon the compression ring 93 can be slipped over the combination of coupling sleeve 101 and pipe end 108 transverse to the longitudinal axis. Because of the spring action of the traction belts 97, the compression jaws 94, 95 come to rest against the periphery of the coupling sleeve 101, and again only by their external transverse edges. Thereupon the drive system 103 is made to contact in such manner that the upper arms 107 of the drive levers 104 externally engage the connection fittings 102 from behind in the manner shown by FIG. 7. The drive levers 104 then are spread apart in the manner previously described whereby the traction belts 97 are pressed together at their free ends. As a result, the coupling sleeve 101 and the pipe end 108 are being radially swaged, the lower compression jaws 95 automatically moving circumferentially, namely the left lower compression jaw 95 clockwise and the right lower compression jaw counter-clockwise. This takes place until the end faces of the compression jaws 94, 95 come to rest against each other, the rubber springs 98 being compressed. This state is shown in FIG. 8.

The compression tool 92 is designed similarly as regards operation as the tool 91. It also comprises a compression ring 109 with three compression jaws 110, 111 of equal lengths. The upper compression jaw 110 is rigidly joined to a compression-jaw support 112, and the two lower compression jaws 111 are circumferentially and displaceably guided on compression-jaw supports 113. The compression-jaw supports 113 are linked by pivot links 114 to the upper compression jaw support 112.

The lower compression jaws 111 comprises notches 115 at their outer peripheries, said notches being entered by axially displaceable pins 116 resting in the lower compression jaw supports 113. These pins 116 are spring-loaded by compression springs 117 toward the notches 115. The pins 116 and the notches 115 are arranged in such manner that the pins are biased to move the lower compression jaws 111 toward each other, namely the shown right lower compression jaw 111 clockwise and the omitted compression jaw counterclockwise. Stops not shown in further detail assure that the lower compression jaws 113 cannot go beyond maximum distances in these two directions.

Drive bolts 118 projecting vertically from the plane of the drawing and assuming the function of the connection fittings 102 of the compression tool 91 are mounted to the free ends of the lower compression jaws supports 113. The drive system 103 shown in the left half of FIGS. 7 and 8 can be hooked-up to these drive bolts 118 by placing the upper arms 107 of the drive levers 104 against the outsides of the drive bolts 118.

The handling of the compression tool 92 is the same as for the compression tool 91. Initially the compression ring 109 is slipped over the coupling sleeve 101 and the pipe end 108 transversely to their longitudinal axis, the two lower compression jaw supports 113 being open, i.e. being pivoted outward as indicated by the dash-dot lines. Then the lower compression jaw supports 113 are made to rest against the outer periphery of the coupling sleeve 101. The previously mentioned circumferential motion stops for the lower compression jaws 111 are mounted in such a way that upon contact with the coupling sleeve 101, equal-size gaps 119, 120 arise between the end faces of the compression jaws 110, 111.

By further spreading apart the lower arms 106 of the drive levers 104, the lower compression jaws 113 are pivoted inward, the lower compression jaws 111 automatically moving in the circumferential direction M, namely the shown right compression jaw 111 counterclockwise and the left, omitted compression jaw clockwise. This goes on until the end faces of the compression jaws 110, 111 come into contact at the end of compression. This state is shown in the right half of FIG. 8.

The compression tool 92 does not differ kinematically and hence not in principle from that of FIGS. 5 and 6 nor from the compression tool 31 of FIGS. 3 and 4 because in those compression tools 61, 31 also the compressing motion of the compression jaws 72, 73 and 42, 43 resp. may be implemented by contracting the upper arms 70, 71 and 40, 41 of the drive levers 64, 65 and 34, 35 operating as compression jaw supports in the region of the upper gap 87 and 57 by making use of a correspondingly designed and separate drive system. In that case the lower arms 68, 69 and 38, 39 of the drive levers 64, 65 and 34, 35 are not needed.

Obviously the compression tools 91, 92 also may be made integral, that is the drive system 103 may be connected by an appropriate housing component with one of the compression jaws 94, 95, 110, 111. In that case this compression jaw 94, 95, 110, 111 would be comparable to the rests 4, 54, 84 in the embodiments of FIGS. 1 through 6. Also, one of the lower compression jaws 95, 111 which is fixed to the compression tool 91, 92 may assume the function of the compression jaw 95, 111 acting as a rest. In this case only one drive lever 104 is required to pull together the compression jaws 94, 95, 110, 111.

I claim:

1. A compression tool, comprising:

a) a housing having adjacently disposed first and second oppositely disposed portions defining therebetween a clearance;

b) first and second pivot levers, each of said levers pivotally secured to one of said portions and extending therefrom beyond said housing;
c) at least three compression jaws operably associated with said housing and disposed about said clearance, one of said jaws is secured to said housing and the other two of said jaws are each connected to one of said levers and are pivotal therewith, said one jaw being separate from said first and second pivot levers;
d) each of said jaws has an arcuate compression surface;
e) means are operably associated with each of said levers and the associated jaw for causing cooperating movement thereof; and
f) drive means are operably engaged with each of said levers exteriorly of said housing for causing pivoting thereof between a first open position and a second closed position, wherein pivoting of said levers from said first open position to said second closed position causes said other two jaws to pivot on each respective lever and relative to said one jaw so that said compression surfaces define a circle for compressing a work piece

2. The tool of claim 1, wherein:
a) means are operably associated with said two jaws and with said housing for spacing apart said two jaws relative to each other and to said third jaw a uniform distance when in said first position.

3. The tool of claim 1, wherein:
a) said compression surfaces are of a uniform length.

4. The tool of claim 1, wherein:
a) said two jaws are movable at an angle of 60° relative to the center point of said third jaw and the center of the circle when said jaws are in said second position.

5. The tool of claim 1, wherein:
a) each of said housing portions includes a support, and each of said levers is pivotally connected to one of said supports.

6. The tool of claim 1, wherein:
a) said causing means guide each of the associated jaws circumferentially relative to the associated compression surface.

7. The tool of claim 6, wherein:
a) said causing means includes a slide device for each jaw, said slide device having a first portion operably associated with the associated jaw and a second portion operably associated with the associated lever and one of said portions being slidable relative to the other of said portions.

8. The tool of claim 6, wherein:
a) said causing means includes means for biasing each of the associated jaws toward the other.

9. The tool of claim 1, further comprising:
a) first and second pivot bolts operably associated with said housing, each of said levers being pivotally mounted to one of said bolts.

10. The tool of claim 9, wherein:
a) at least a portion of said one jaw is disposed between said bolts.

11. The tool of claim 9, wherein:
a) said bolts extend in parallel relation.

12. The tool of claim 3, wherein:
a) each of said compression surfaces subtends an arc of circle having a radius equal to the radius of the arc of the circle of the other compression surfaces.

13. The tool of claim 1, wherein:
a) said causing means includes a biased pin for each of said two jaws.

14. The tool of claim 13, wherein:
a) each of said pins is operably associated with one of said levers.

15. The tool of claim 14, further comprising:
a) a notch is disposed in the periphery of each of said two jaws; and
b) each of said pins is engagable with an associated one of said notches for causing movement of the associated jaw.

16. The tool of claim 15, wherein:
a) said pins are biased so that said two jaws tend to be moved toward each other.

17. The tool of claim 13, wherein:
a) each of said pins is biased by a compression spring.

18. The tool of claim 17, wherein:
a) each of said pins is axially displaceably seated in the associated lever.

19. The tool of claim 18, further comprising:
a) first and second pivot bolts operably associated with said housing, each of said levers being pivotally mounted to one of said bolts; and
b) each of said pins is disposed upon a first side of the associated bolt and said drive means is disposed upon an opposite side of said pivot bolts.

20. The tool of claim 12, wherein:
a) each of said compression surfaces subtends an arc of 120°.

* * * * *